United States Patent
Mitra et al.

(10) Patent No.: US 11,182,542 B2
(45) Date of Patent: Nov. 23, 2021

(54) EXPOSING ANNOTATIONS IN A DOCUMENT

(71) Applicant: Microsoft Technology Licensing, LLC, Redmond, WA (US)

(72) Inventors: Mahasweta Mitra, Bellevue, WA (US); Mansi Awasthi, Hyderabad (IN); Deepak Agrawal, Redmond, WA (US); Mohit Bansal, Hyderabad (IN); Amit Kundlia, Hyderabad (IN); Shalu Gupta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 16/173,551

(22) Filed: Oct. 29, 2018

(65) Prior Publication Data
US 2020/0134005 A1 Apr. 30, 2020

(51) Int. Cl.
*G06F 17/00* (2019.01)
*G06F 40/169* (2020.01)
(Continued)

(52) U.S. Cl.
CPC .......... *G06F 40/169* (2020.01); *G06F 16/316* (2019.01); *G06F 16/34* (2019.01); *G06F 40/117* (2020.01); *G06F 40/14* (2020.01)

(58) Field of Classification Search
CPC .. G06F 40/169; G06F 15/0291; G06F 16/316; G06F 16/34; G06F 40/117; G06F 40/14
See application file for complete search history.

(56) References Cited

U.S. PATENT DOCUMENTS

| 7,317,834 B2 * | 1/2008 | Dresevic | G06F 40/103 382/186 |
| 7,343,552 B2 * | 3/2008 | Denoue | G06F 40/169 715/230 |

(Continued)

FOREIGN PATENT DOCUMENTS

KR 20170043292 A 4/2017

OTHER PUBLICATIONS

PCT Search Report and Written Opinion for PCT/US2019/056410, including translation of Korean patent document No. KR20170043292A, dated Jan. 28, 2020, 28 pages.
(Continued)

*Primary Examiner* — Mohammed H Zuberi

(57) ABSTRACT

A technique is described herein for effectively exposing annotation information in a document for use by various applications. The technique involves generating a tag tree data structure that identifies a collection of tag elements associated with a document. The technique also generates an overlay data structure that identifies a collection of annotations associated with the document. The overlay data structure also links the annotations to corresponding parts identified in the tag tree data structure. The technique then uses the tag tree data structure and the overlay data structure to provide information to a document-consuming component that conveys an order in which one or more annotations appear in the document relative to one or more parts in the document. According to one illustrative aspect, at least one annotation described by the overlay data structure is an active annotation, corresponding to a transient annotation that has not been saved.

17 Claims, 11 Drawing Sheets

(51) Int. Cl.
  *G06F 16/31* (2019.01)
  *G06F 16/34* (2019.01)
  *G06F 40/117* (2020.01)
  *G06F 40/14* (2020.01)

(56) References Cited

U.S. PATENT DOCUMENTS

| | | | | |
|---|---|---|---|---|
| 7,606,797 | B2* | 10/2009 | McCammon | G06F 16/319 |
| 7,630,968 | B2* | 12/2009 | McCammon | G06F 40/30 |
| 7,703,001 | B2* | 4/2010 | Takaai | G06K 9/00456 |
| | | | | 715/232 |
| 7,716,571 | B2* | 5/2010 | Tien | G06Q 30/00 |
| | | | | 715/212 |
| 7,716,592 | B2* | 5/2010 | Tien | G06Q 40/00 |
| | | | | 715/744 |
| 7,840,896 | B2* | 11/2010 | Tien | G06Q 10/10 |
| | | | | 715/243 |
| 7,895,170 | B2* | 2/2011 | Shiga | G06F 16/38 |
| | | | | 707/695 |
| 8,010,901 | B1* | 8/2011 | Rogers | G06F 16/954 |
| | | | | 715/751 |
| 8,037,137 | B2* | 10/2011 | Keohane | G06Q 10/107 |
| | | | | 709/206 |
| 8,181,103 | B2* | 5/2012 | Lin | G06F 40/171 |
| | | | | 715/230 |
| 8,190,992 | B2* | 5/2012 | Tien | G06Q 30/00 |
| | | | | 715/243 |
| 8,261,181 | B2* | 9/2012 | Tien | G06Q 10/10 |
| | | | | 715/230 |
| 8,261,182 | B1 | 9/2012 | Petersen | |
| 8,319,736 | B2* | 11/2012 | Petschnigg | G06F 3/04883 |
| | | | | 345/173 |
| 8,321,805 | B2* | 11/2012 | Tien | G06Q 10/06 |
| | | | | 715/772 |
| 8,352,855 | B2* | 1/2013 | Levy | G06F 40/174 |
| | | | | 715/243 |
| 8,447,748 | B2* | 5/2013 | Lee | G06F 16/951 |
| | | | | 707/706 |
| 8,495,495 | B2* | 7/2013 | Isozu | G06F 16/9562 |
| | | | | 715/720 |
| 8,495,663 | B2* | 7/2013 | Tien | G06Q 10/10 |
| | | | | 719/329 |
| 8,516,048 | B2* | 8/2013 | Gupta | G06F 16/00 |
| | | | | 709/204 |
| 8,549,399 | B2* | 10/2013 | Mansfield | G06F 40/106 |
| | | | | 715/246 |
| 8,751,559 | B2* | 6/2014 | Richardson | H04L 67/306 |
| | | | | 709/202 |
| 8,773,473 | B2* | 7/2014 | Hoover | G06F 3/04883 |
| | | | | 345/677 |
| 8,874,504 | B2* | 10/2014 | King | G06F 16/9554 |
| | | | | 707/608 |
| 9,141,404 | B2* | 9/2015 | Murray | H04L 67/42 |
| 9,251,130 | B1 | 2/2016 | Lynnes et al. | |
| 10,002,117 | B1* | 6/2018 | Ain | G06F 40/143 |
| 2003/0013073 | A1* | 1/2003 | Duncan | G09B 5/02 |
| | | | | 434/317 |
| 2005/0209989 | A1* | 9/2005 | Albornoz | G06F 40/134 |
| 2005/0289452 | A1* | 12/2005 | Kashi | G06F 40/169 |
| | | | | 715/232 |
| 2007/0174761 | A1 | 7/2007 | Lin et al. | |
| 2007/0294614 | A1 | 12/2007 | Jacquin et al. | |
| 2010/0077320 | A1* | 3/2010 | Lepore | G06F 40/151 |
| | | | | 715/760 |
| 2010/0153835 | A1* | 6/2010 | Xiong | G06F 40/169 |
| | | | | 715/230 |
| 2013/0080871 | A1* | 3/2013 | Howarth | G06F 16/958 |
| | | | | 715/230 |
| 2013/0145249 | A1* | 6/2013 | Harper | G06F 40/169 |
| | | | | 715/230 |
| 2016/0196251 | A1 | 7/2016 | Patnoe | |
| 2017/0060829 | A1* | 3/2017 | Bhatt | G06F 40/134 |
| 2017/0329863 | A1 | 11/2017 | Metz et al. | |
| 2020/0134255 | A1* | 4/2020 | Nocedal | G06F 40/14 |

OTHER PUBLICATIONS

"Use annotation and drawing markup tools to add comments in PDFs," available at <<https://helpx.adobe.com/in/acrobat/using/commenting-pdfs.html>>, Adobe Systems Incorporated, San Jose, CA, accessed on Oct. 29, 2018, 13 pages.

"Annotations and Tags," available at <<https://help.aprimo.com/bundle/mo_marketing_operations_basics/page/ynv1480520885532.html>>, Teradata Corporation, San Diego, CA, accessed on Sep. 19, 2018, 6 pages.

"Correct reflow problems with the Content panel," available at <<https://helpx.adobe.com/in/acrobat/using/editing-document-structure-content-tags.html>>, Adobe Systems Incorporated, San Jose, CA, accessed on Oct. 29, 2018, 17 pages.

"TagNotate: Innovation in Annotation," available at <<https://web.archive.org/web/20140917094430/http:/www.tagnotate.com/>>, Tim and Gerry Inc., WebBackMachine date of Sep. 17, 2014, accessed on Sep. 19, 2018, 4 pages.

"About NV Access," available at <<https://www.nvaccess.org/about-nv-access/>>, NV Access Limited, Queensland, Australia, accessed on Sep. 19, 2018, 7 pages.

"NVDA 2018.3 User Guide," available at <<https://www.nvaccess.org/files/nvda/documentation/userGuide.html>>, NV Access Limited, Queensland, Australia, accessed on Sep. 19, 2018, 76 pages.

"User Manual: FOXIT Reader for Microsoft Windows," available at <<http://cdn01.foxitsoftware.com/pub/foxit/manual/reader/en_us/FoxitReader9.2_Manual.pdf>>, Foxit Software, Inc., Fremont, CA, Jul. 19, 2018, 232 pages.

"Chapter 2: Learning Narrator basics," available at <<https://support.microsoft.com/en-US/help/22808>>, Microsoft Corporation, Redmond, WA, retrieved on Sep. 19, 2018, 5 pages.

"Microsoft Narrator," available at <<https://en.wikipedia.org/wiki/Microsoft_Narrator>>, Wikipedia article, accessed on Sep. 19, 2018, 2 pages.

"Document management—Portable document format—Part 1: PDF 1.7," available at <<https://www.adobe.com/content/dam/acom/en/devnet/pdf/PDF32000_2008.pdf>>, First Edition, Jul. 2008, Adobe Systems Incorporated, San Jose, CA, 756 pages.

"PDF," available at <<https://en.wikipedia.org/wiki/PDF>>, Wikipedia article, accessed on Sep. 21, 2018, 18 pages.

"Screen reader," available at <<https://en.wikipedia.org/wiki/Screen_reader>>, Wikipedia article, accessed on Sep. 22, 2018, 5 pages.

* cited by examiner

SCENARIO 1: AN ILLUSTRATIVE RETRIEVAL OPERATION

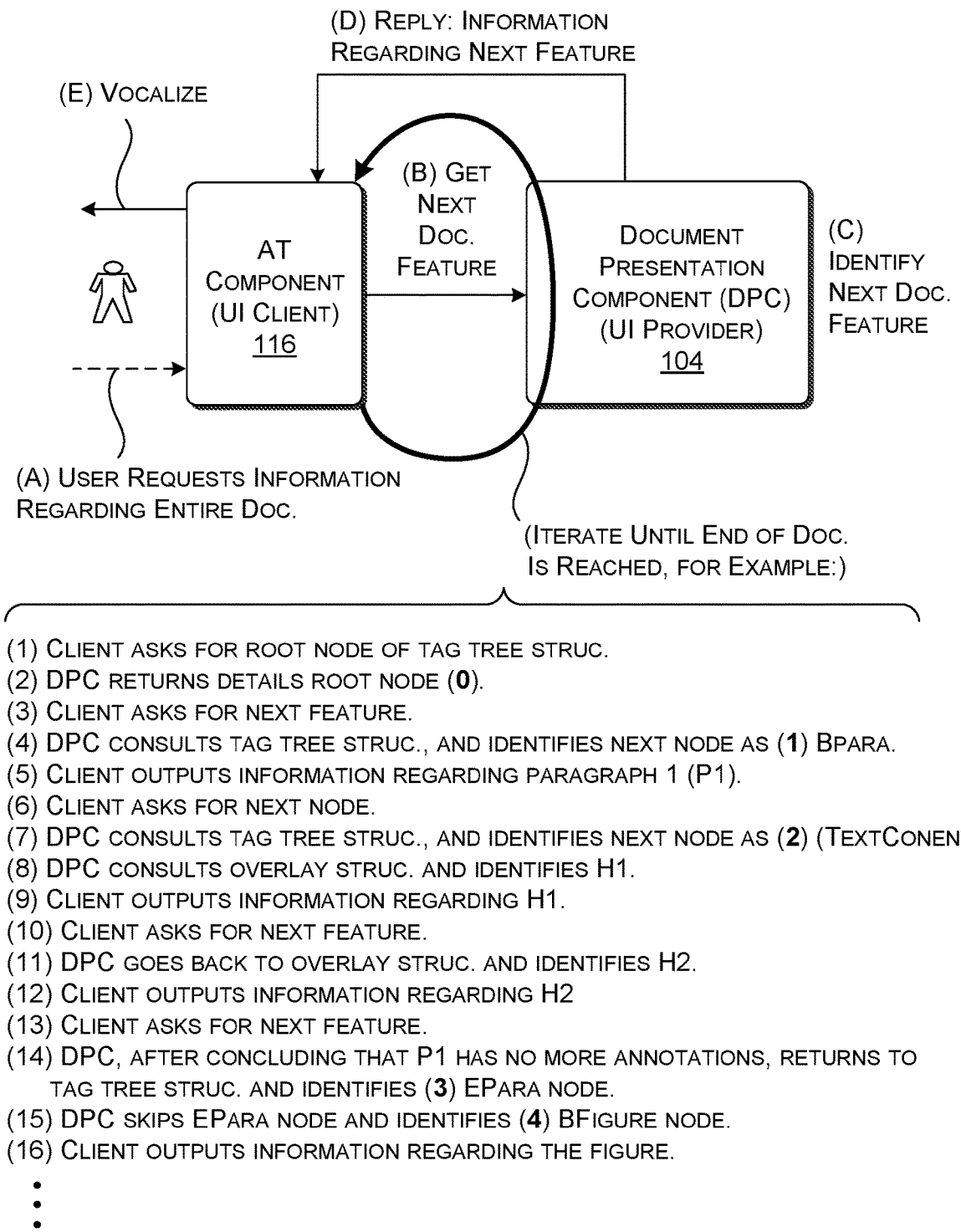

(1) CLIENT ASKS FOR ROOT NODE OF TAG TREE STRUC.
(2) DPC RETURNS DETAILS ROOT NODE (0).
(3) CLIENT ASKS FOR NEXT FEATURE.
(4) DPC CONSULTS TAG TREE STRUC., AND IDENTIFIES NEXT NODE AS (1) BPARA.
(5) CLIENT OUTPUTS INFORMATION REGARDING PARAGRAPH 1 (P1).
(6) CLIENT ASKS FOR NEXT NODE.
(7) DPC CONSULTS TAG TREE STRUC., AND IDENTIFIES NEXT NODE AS (2) (TEXTCONENT).
(8) DPC CONSULTS OVERLAY STRUC. AND IDENTIFIES H1.
(9) CLIENT OUTPUTS INFORMATION REGARDING H1.
(10) CLIENT ASKS FOR NEXT FEATURE.
(11) DPC GOES BACK TO OVERLAY STRUC. AND IDENTIFIES H2.
(12) CLIENT OUTPUTS INFORMATION REGARDING H2
(13) CLIENT ASKS FOR NEXT FEATURE.
(14) DPC, AFTER CONCLUDING THAT P1 HAS NO MORE ANNOTATIONS, RETURNS TO TAG TREE STRUC. AND IDENTIFIES (3) EPARA NODE.
(15) DPC SKIPS EPARA NODE AND IDENTIFIES (4) BFIGURE NODE.
(16) CLIENT OUTPUTS INFORMATION REGARDING THE FIGURE.

```
ACCESS A DOCUMENT STORED IN A DOCUMENT FILE.
904
```
↓
```
GENERATE A FIRST DATA STRUCTURE AT RUNTIME THAT IDENTIFIES A
COLLECTION OF TAG ELEMENTS ASSOCIATED WITH THE DOCUMENT. EACH TAG
ELEMENT DESCRIBES A PART OF THE DOCUMENT.
906
```
↓
```
GENERATE A SECOND DATA STRUCTURE AT RUNTIME THAT IDENTIFIES A
COLLECTION OF OVERLAY ELEMENTS ASSOCIATED WITH THE DOCUMENT. EACH
OVERLAY ELEMENT DESCRIBES AN ANNOTATION ADDED TO THE DOCUMENT.
FURTHER, EACH OVERLAY ELEMENT MAKES REFERENCE TO AT LEAST ONE
CORRESPONDING PART DESCRIBED IN THE FIRST DATA STRUCTURE WITH WHICH
THE OVERLAY ELEMENT IS ASSOCIATED.
908
```
↓
```
USE THE FIRST DATA STRUCTURE AND THE SECOND DATA STRUCTURE TO
PROVIDE INFORMATION TO A DOCUMENT-CONSUMING COMPONENT THAT
SPECIFIES AN ORDER IN WHICH ONE OR MORE ANNOTATIONS APPEAR IN THE
DOCUMENT RELATIVE TO ONE OR MORE PARTS IN THE DOCUMENT.
910
```

FIG. 9

EXPOSING ANNOTATIONS IN A DOCUMENT

BACKGROUND

A document may include tag information that describes its different parts. For example, a Portable Document Format (PDF) document may include a logical structure which provides semantic tags associated with different parts of the document. An assistive technology (AT) application can use the tag information to help a disabled user interact with the document. For example, a document-narration application can use the tag information to verbalize a document's tags and associated textual content in a specified reading order. This manner of presentation assists a vision-impaired user in interacting with the document. Other AT applications use the tag information to help other users, having other specified needs, in interacting with the document. The user's needs may also depend on context. For instance, any user may choose to interact with any kind of text-to-speech application in certain environments and not others.

While the above-described technology is useful, it has limitations. For example, users commonly use various applications to mark up a document with annotations of various kinds, including highlighting, underlining, strikethrough, comments, etc. Existing technology does not provide an effective mechanism for exposing annotation information to consuming applications, such as text-to-speech applications. This shortcoming leads to poor user experience. That is, by not being able to "see" the annotations, the user cannot interact with them, even though the annotations may be among the most interesting parts of the document from the user's standpoint.

SUMMARY

A technique is described herein for effectively exposing annotation information associated with a document for use by any consumer(s) of this information, such as, but not limited to, an assistive technology (AT) component. According to one implementation, the technique involves generating a first data structure (a tag tree data structure) that identifies tag elements associated with a document. Each such tag element semantically describes a part of the document, such as a paragraph, figure, link, etc. The technique also generates a second data structure (an overlay data structure) that identifies a collection of overlay elements associated with the document. Each overlay element describes an annotation which was created concurrently with the document, or any new annotation added following the creation of the document. Each overlay element also includes linking information that makes reference to a corresponding part or parts described in the tag tree data structure with which the overlay element is associated. The technique then uses the tag tree data structure and the overlay data structure to provide information to a consumer that specifies an order in which one or more annotations appear in the document relative to one or more parts of the document. Hence, the technique integrates information extracted from the two data structures to reconstruct and expose a correctly-ordered semantic layout of a marked-up document. The consumer, however, need not be made aware of this underlying process of semantic synthesis.

For example, assume that a document includes a paragraph with highlighting applied to one of the paragraph's sentences. In one scenario, the technique can expose information to a document-narration application which allows the document-narration application to verbalize, in order: (1) the presence of the paragraph; (2) the text of the paragraph; (3) the existence of highlighting in the paragraph; and (4) the portion of the paragraph that is affected by the highlighting, etc. Exposing document information in this manner is useful because it alerts the user to the existence of an annotation, and furthermore allows the user to understand the correct relation of the annotation to the document as a whole. This information empowers a user to more effectively interact with the document and its annotations.

According to another illustrative aspect, the technique generates the tag tree data structure based on original tag information previously associated with the document and stored in a document file.

According to another illustrative aspect, the technique can be used to expose both persisted and active annotations. An active annotation refers to an annotation that a user has created but not yet saved. (Note that the user may save an annotation by saving the document after the annotation has been created). A persisted annotation refers to an annotation that the user has previously saved, or which was originally associated with the document by its author. By virtue of this aspect, the technique can provide effective feedback to a user regarding an annotation he or she has just created, even though that annotation has not yet been saved.

According to another illustrative aspect, the technique only generates the tag tree data structure and the overlay data structure when a user has explicitly or implicitly invoked an assistive technology mode.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 shows a scenario in which the computing environment of FIG. 1 provides information to an AT component regarding the document of FIG. 4.

FIGS. 9-11 show three respective overviews of the operation of the computing environment of FIG. 1. The different overviews emphasize different combinations of features associated with the operation of the computing environment.

Figure 1:
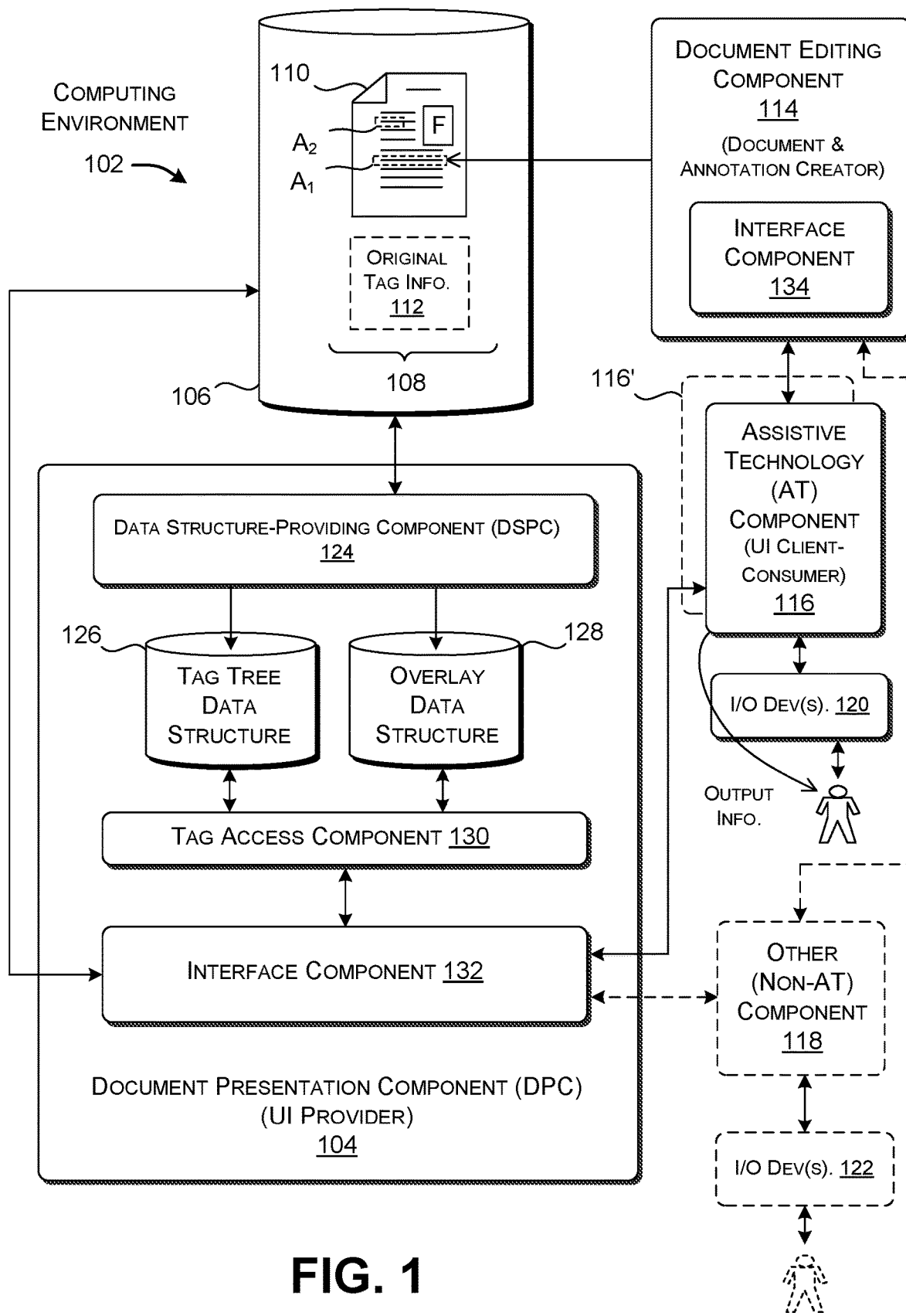
FIG. 1 shows an illustrative computing environment in which a document presentation component exposes information regarding annotations for use by an assistive technology (AT) component, or some other document-consuming component(s).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for exposing information regarding features of an electronic document, including its original parts and supplemental annotations. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. The term "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an illustrative computing environment 102 in which a document presentation component (DPC) 104 exposes information that describes different features associated with an electronic document (henceforth, simply "document"). The features include parts of the document's original content, as well as supplemental annotations added to the document by one or more users. Without limitation, the parts can include any combination of the document's titles, headings, paragraphs, figures, lists, tables, original links, etc. Without limitation, the supplemental annotations can include highlighting, strikethrough, underlining, comments, ink strokes, etc. A data store 106 stores the document as a document file 108.

Broadly, the file 108 associated with the document can include at least the document's consumable content 110 and original tag information 112 which describes the content. The content 110, for example, provides the original text, figures, links, etc. which make up the document. The content 110 may also include a set of annotations (if any) added by one or more users. The original tag information 112 provides a collection of semantic tags which describe the parts of the documents as originally defined by the creator of the document, such as its titles, headings, paragraphs, figures, lists, tables, original links, etc. Since the original tag information 112 describes the original parts of the document, assume that it will not include semantic tags which describe the annotations added to the document, e.g., concurrently with the creation of the document or at a later time. And for this reason, previous technology did not expose meaningful in-order semantic information regarding the existence of the annotations.

In one implementation, the document corresponds to a Portable Document Format (PDF) document, e.g., as described in ISO 32000-1:2008, "Document Management—Portable Document Format—Part 1," published July, 2008 by the International Organization for Standardization. However, the principles described herein apply to any document that includes the kinds of components set forth above, including: a set of identifiable parts, a set of zero, one, or more annotations added by a user (or users), and original tag information 112 which describes it various parts. For example, the principles described herein can be applied to a document produced by a word-processing application, a slide presentation produced by a slide-creation application, a spreadsheet produced by a spreadsheet-processing application, and so on.

The DPC 104 exposes part information and annotation information to consumers of this information. The part information describes the various parts of the documents. The annotation information describes the annotations added to the document in one or more user sessions. Further, the DPC 104 exposes the correct relation between the part information and the annotation information. For example, assume that a user highlights a sentence within a paragraph of the document. The DPC 104 alerts a consumer to both the existence of the paragraph and the annotation. The DPC 104 also conveys the relation of the highlighting to the paragraph. A consuming application can leverage this information to deliver a structured description of the document, including its highlighting. For example, a consuming application can describe the highlighting immediately after a description of the paragraph with which the highlighting is associated. By operating in this manner, the DPC 104 assists a user in understanding the context the highlighting plays within the document.

FIG. 1 also shows a document editing component 114 for use in creating the original document and/or in creating annotations subsequently added to the document (and/or in creating annotations added to the document at the same time as its original creation). The document editing component 114 can use any logic for creating documents and producing annotations. For instance, the popular ACROBAT software tool provided by ADOBE SYSTEMS INCORPORATED of San Jose, Calif. allows users to create and edit the content associated with PDF documents. Many manufacturers provide PDF reader applications that allow users to add annotations to existing PDF documents, although users cannot generally create or edit document content using these products.

FIG. 1 also shows various consumers of the information provided by the DPC 104, including an assistive technology (AT) component 116 and (optionally) a non-assistive technology (non-AT) component 118. The AT component 116 corresponds to any logic which leverages the DPC's information to assist a user with any kind(s) of disability(ies) that impair (or otherwise affect) his or her interaction with the document. For example, the AT component 116 may correspond to any kind of document-narration application which provides a voice synthesizer that vocalizes the information provided by the DPC 104. This manner of delivering information helps a vision-impaired user understand the contents of the document. Other AT components may provide custom interfaces designed to assist users with cognitive, speech, hearing, experience-related, language-related, and/or motor impairments, etc. A user without any special needs may also choose to utilize the AT component 116 for any context-specific reason(s). For instance, a user who cannot currently attend to a visual presentation of a document (because of some environment-specific distraction) may utilize the AT component 116 to receive an audible read-out of the document's contents.

The AT component 116 works in conjunction with one or more input devices and one or more output devices of any kind(s) (generally represented in FIG. 1 as "I/O device(s)" 120). For example, a document-narration application uses one or more speakers to produce spoken output information. The I/O device(s) 120 can also include any kind of specialized device(s) designed for use with people having disabilities, such as a device which maps output information into tactile braille patterns.

The non-AT component 118 corresponds to any logic that is not specifically designed to assist users who have an identified impairment. The non-AT component 118 interacts with one or more input devices and one or more output devices of any kind(s), referred to herein as I/O device(s) 122.

As will be described below, the DPC 104 provides first descriptive information in an assistive technology (AT) mode, and second descriptive information in a non-AT mode. The first descriptive information is generally richer than the second descriptive information. For example, the first descriptive information conveys the relation of annotations (if any) to the parts of the document, while the second information does not. The DPC 104 can determine whether the user has invoked the AT mode in an explicit manner (e.g., by selecting this mode via a control setting), or invoked the AT mode in an implicit manner (e.g., by choosing to interact with the document using the AT component 116 as opposed to the non-AT component 118).

The computing environment 102 will be set forth herein in the above-specified context in which the AT component 116 (and optionally the non-AT component 118) interact with a document. But more generally, any document-consuming component 116' can receive and process the first descriptive information for any context-specific reason(s), for the benefit of any kind of end user. Moreover, the document-consuming component 116' can include any logic for processing the first descriptive information. In one case, the document-consuming component 116' processes the first descriptive information by displaying it on a display device in any fashion, etc. In another case, the document-consuming component 116' processes the first descriptive information by converting text to speech in any user case scenario, not limited to AT scenarios. But, to repeat, this description will set forth the operation of the computing environment 102 with reference to the AT component 116 and the non-AT component 118, to thereby facilitate explanation by making reference to a concrete case. The AT component 116 is to be interpreted as one non-limiting example of the document-consuming component 116'.

Figure 2:
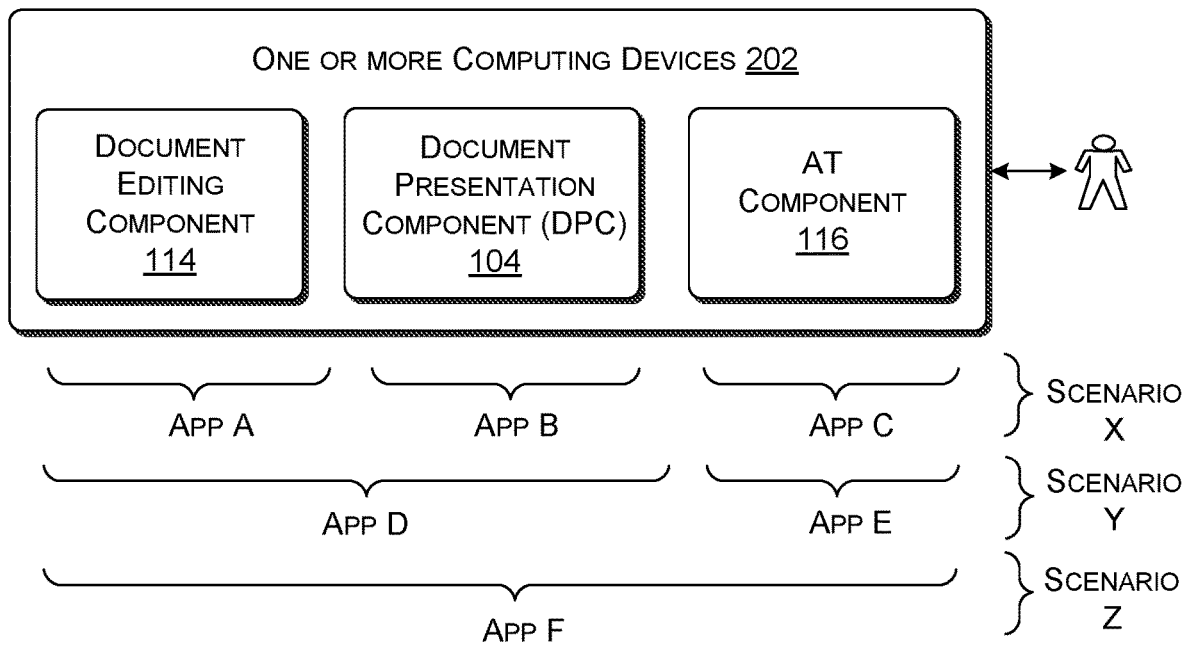
FIG. 2 shows one implementation of the computing environment described in FIG. 1.

Advancing momentarily to FIG. 2, this figure shows different ways of implementing the DPC 104, the document editing component 114, and the AT component 116. Broadly, these three components refer to logic that can implement three main functions: (1) generating and editing the document (in the case of the document editing component 114); (2) exposing information about the document (in the case of the DPC 104); and (3) consuming the information that has been exposed (in the case of the AT component 116). In this sense, the document editing component 114 operates as a document creator, the DPC 104 operates as user interface (UI) exposer or provider, while the AT component 116 operates as a UI consumer or client. Different implementations can allocate the above-identified three functions to different respective applications. For example, in a scenario X, an implementation may devote three respective applications (A, B, and C) to the above-identified three functions. In a scenario Y, a single application D can perform the functions of the document editing component 114 and the DPC 104, while an application E can perform the function of the AT component 116. For example, a document reader application can both allow a user to add annotations to a preexisting document (thus performing a function of the document editing component 114) and expose information regarding the document (thus performing the function of the DPC 104). A separate document-narration application can consume the information exposed by the document reader application. In a scenario Z, a single application F can perform all of the above-identified functions. Still other function-to-application allocations are possible.

Likewise, different implementations can allocate the above-identified functions to different computing devices 202. In one case, a single computing device can implement all three functions. For example, that computing device can correspond to a user computing device of any kind, such as a desktop personal computing device, a handheld computing device of any kind (such as a smartphone, a tablet computing device, etc.), a wearable computing device, a vehicle-borne computing device, a game console, a mixed reality device of any kind, etc. Or the computing device can correspond to a remote server with which the user interacts using a user computing device over a computer network (not shown).

In other cases, two or more computing devices can implement the above-identified functions in distributed fashion. For example, a user computing device can implement a first subset of the above-described functions and a server can implement a second subset of the above-described functions. A computer network (not shown) can communicatively couple the user computing device and the server. In other cases, two or more local computing devices can implement the above-identified functions. In still other cases, two or more remote computing systems can implement the above-identified three functions.

Moreover, in some cases, the computing device which implements the AT component 116 can incorporate the I/O device(s) 120. For example, a specialized braille-reading device can incorporate the AT component 116 and an output device for converting output information into tactile brail patterns.

To facilitate explanation, the remaining description will continue to refer to the above-identified three functions as respective separate components. But per the above clarification, these functions can be bundled together in any number of application(s), and allocated to any number of computing device(s).

Returning to FIG. 1, the DPC 104 includes a data structure-providing component (DSPC) 124 that generates two data structures in memory at runtime: a tag tree data structure stored in a data store 126, and an overlay data structure stored in a data store 128. As more fully described below, the DSPC 124 produces the tag tree data structure by transforming the original tag information 112 into a vector of nested tag elements. The DSPC 124 produces the overlay data structure by producing a per-page collection of overlay elements. Each overlay element describes an annotation added to the document. Each overlay element also includes linking information which associates its annotation with an appropriate part (or parts) of the tag tree data structure. For example, consider the case of a highlighting mark added to a sentence of a paragraph. The overlay element points to the part(s) of the tag tree data structure which describe that paragraph.

A tag access component 130 retrieves information from the tag tree data structure and the overlay data structure when requested by a consumer, and/or in response any other access-invoking event. In one circumstance, the tag access component 130 can accomplish this access operation by using the tag tree data structure to identify a part (or parts) of the tag tree data structure that corresponds to an identified focus-of-interest within a document. It then uses the overlay data structure to find any annotations that relate to the identified part(s) of the tag tree data structure.

An interface component 132 provides a programmatic interface that allows the AT component 116 to retrieve information from the DPC 104. In one implementation, the interface component 132 accomplishes this task using one or more Application Programming Interfaces (APIs). For example, a first API provides a mechanism through which a user (or other consuming entity) can retrieve detail regarding a currently-designated feature of the document. The user (or other consuming entity) can designate a feature by specifying an input condition. For example, an input condition may describe a feature-of-interest in the document by specifying any of: the feature's (x, y) position; a character, word, paragraph, figure, etc. associated with the feature; a node index associated with the feature (if known), etc.

A second API can allow a user (or other consumer) to retrieve information that identifies a next-in-sequence feature in the document, given an identified input condition. For example, assume that the input condition specifies a paragraph of the document. The user can invoke the second API to determine the semantic tag associated with a next part of the document in a prescribed reading order of document features. Or the second API can be used to retrieve an annotation that is associated with the paragraph. A third API can allow a user (or other consuming entity) to retrieve information that identifies a previous-in-sequence feature in the document, given an identified input condition. For example, again assume that the input condition specifies a paragraph of the document. The third API can identify that feature of the document that immediately precedes the paragraph in a prescribed reading order. Note that the above-described three APIs are set forth in the spirit of illustration, not limitation. Other implementations can allow consumers to retrieve information from the DPC 104 using yet other kinds of APIs.

Overall, note that the tag tree data structure defines the order in which parts are considered to be arranged within the document. The overlay data structure "hangs" its overlay elements onto appropriate parts of the tag tree data structure, thereby defining the order of the annotations relative to the order of the parts defined by the tag tree data structure. Hence, DPC 104 can be said to reconstruct the order of all features in a document (including its original parts and annotations) based on the both the tag tree data structure and the overlay data structure.

But note that the external AT component 116 may have no awareness of how the tag access component 130 retrieves part information and annotation information. Indeed, the AT component 116 may have no awareness that the DPC 104 is maintaining two runtime data structures, or that the reading order is influenced by information in these two data structures. In this sense, the DPC 104 can be said to present a logical layer which represents the information in the tag tree data structure and the overlay data structure as a single unified resource. This manner of resource abstraction is advantageous because it reduces the complexity of the protocols by which external consumers interact with the DPC 104. It also widens the universe of consuming applications that can successfully interact with the DPC 104 with no modification or minimal modification.

The interface component 132 can provide another set of APIs for use by the non-AT component 118 in interacting with the document. For instance, the interface component 132 can use these APIs to provide information regarding the original tag information 112. In this manner of operation, the DPC 104 can omit all processing related to the generation and maintenance of the tag tree data structure and the overlay data structure.

The document editing component 114 can include its own interface component 134 that allows the AT component 116 to interact with it. For example, the interface component 134 can expose semantic tag information that describes different parts of a graphical user interface presentation provided by the document editing component 114. A document-narration application can leverage this information to verbally describe the graphical user interface presentation. The interface component 134 can also accommodate a user's interaction with the document editing component 114 via the non-AT component 118.

Figure 3:
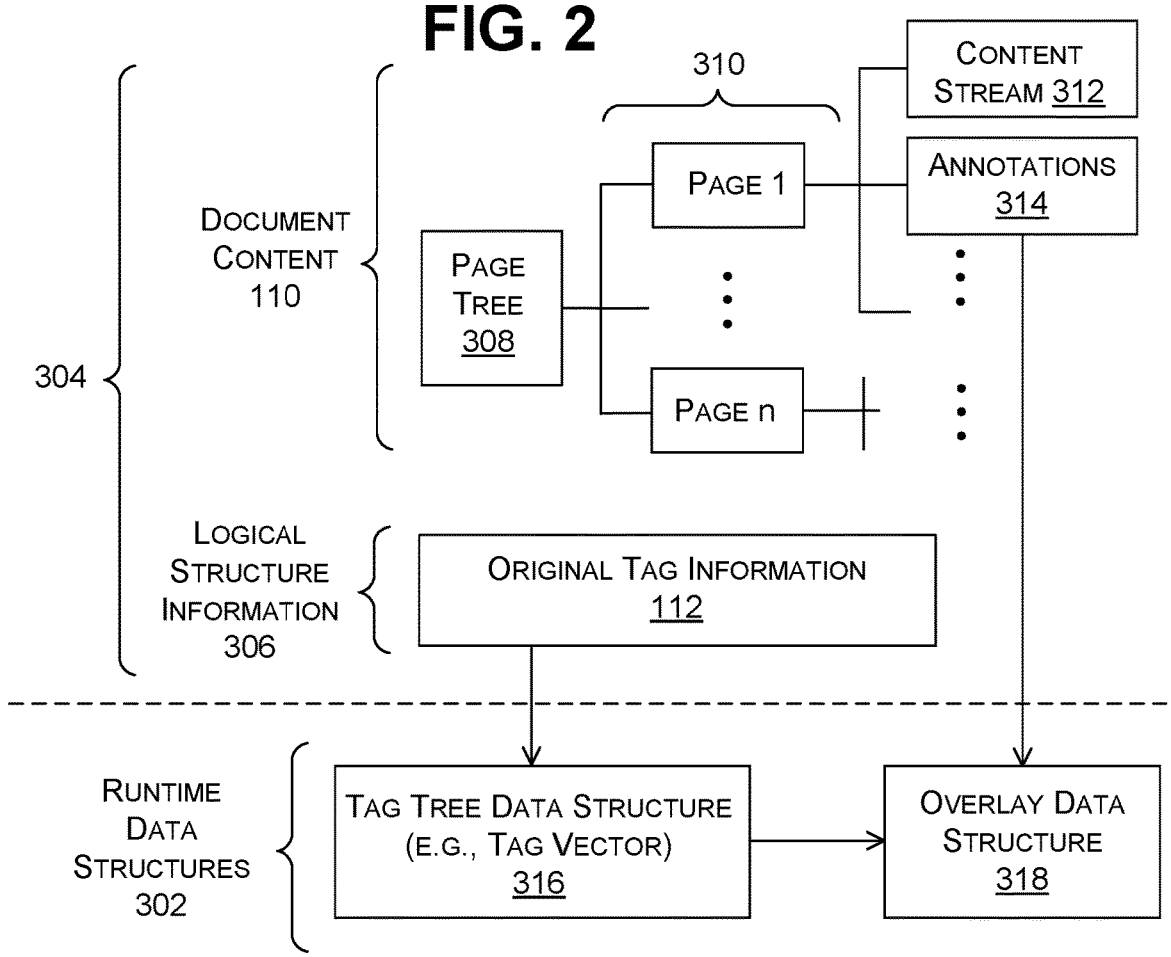
FIG. 3 shows data structures used in the computing environment of FIG. 1.

FIG. 3 shows data structures associated with the computing environment 102 of FIG. 1. More specifically, FIG. 3 distinguishes between the two runtime data structures 302 generated by the DSPC 124 (of FIG. 1), and the base information 304 from which the DSPC 124 draws to generate the two runtime data structures 302.

The base information 304 includes the document's content 110 and logical structure information 306. In one implementation, the document's content 110 is organized using a page tree data structure 308. The page tree data structure 308 provides a linked set of pages 310 associated with the document. The page tree data structure 308 also enumerates the content associated with each page. For example, for page 1, the page tree data structure 308 provides a content stream 312 which specifies the actual text, images, etc. associated with this page. The page tree data structure 308 also provides a set of annotations 314 associated with page 1, such as highlighting, underlining, comments, etc., added by one or more users and/or by the original author of the document, possibly at different times.

The logical structure information 306 characterizes the content 110. The logical structure information 306 includes at least the original tag information 112. The original tag information 112 provides semantic tags associated with different parts of the document's page tree data structure 308. But as noted above, assume that the original tag information 112 excludes semantic tags that describe the annotations 314 that one or more users have added following the original creation of the document and/or concurrently with the original creation of the document.

At runtime, the DSPC 124 generates a tag tree data structure 316 and an overlay data structure 318. The DSPC 124 generates the tag tree data structure 316 by reformulating the original tag information 112. In one implementation, the original tag information 112 remains static unless a user changes the actual content 110 of the document. Hence, in this implementation, the tag tree data structure 316 is likewise static. The DSPC 124 generates the overlay data structure 318 by consulting the tag tree data structure 316 and the annotations 314.

Figure 4:
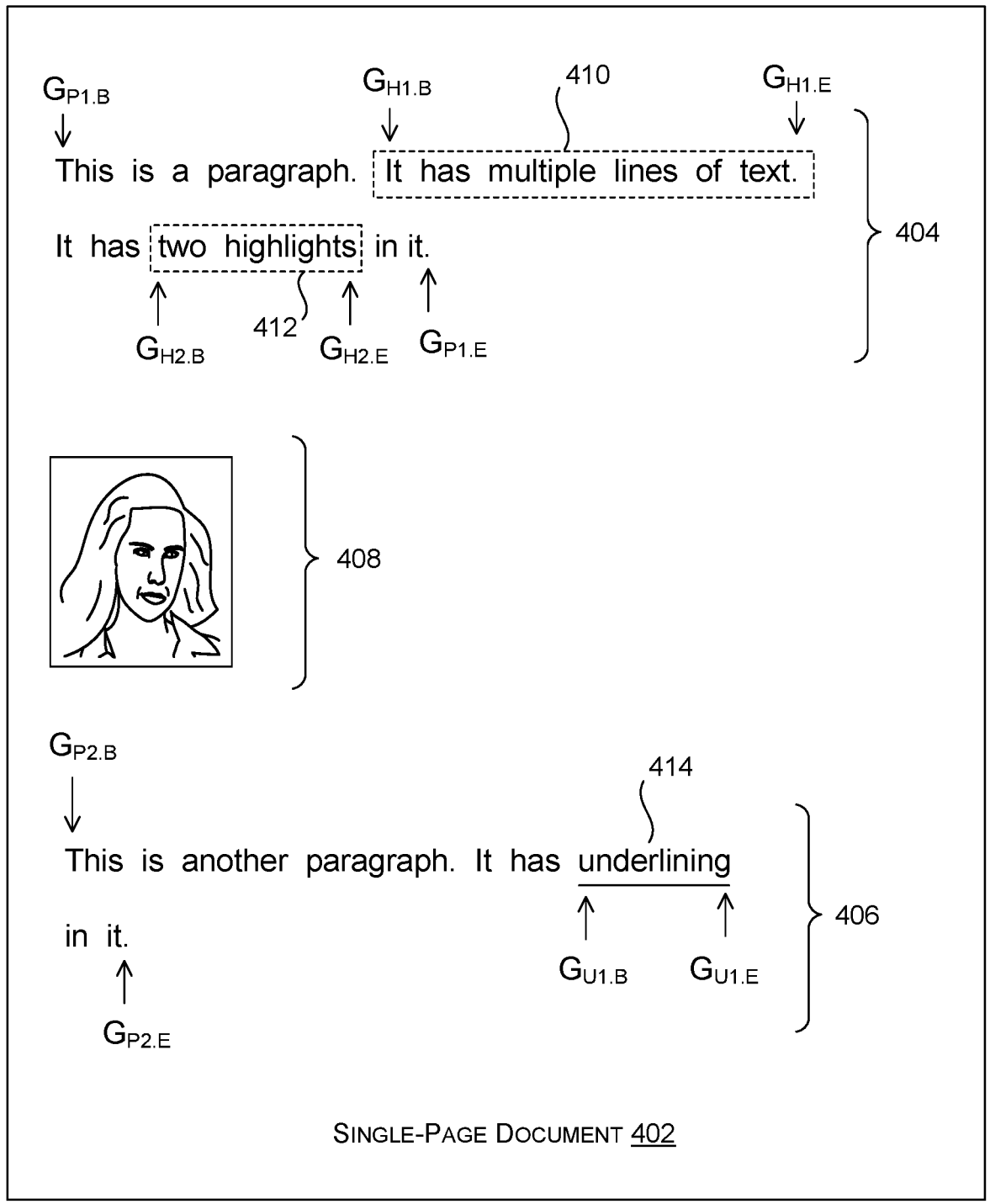
FIG. 4 shows an illustrative document that will be used to describe the operation of the computing environment of FIG. 1.

FIG. 4 shows a simplified one-page document 402 that will serve to clarify the operation of the DSPC 124 in the remainder of Section A. The document 402 includes two paragraphs (404, 406) and a FIG. 408. The FIG. 408 lies between the two paragraphs (404, 406). The first paragraph 404 begins at position $G_{P1\_B}$ and ends at position $G_{P1\_E}$. The second paragraph begins at position $G_{P2\_B}$ and ends at position $G_{P2\_E}$. The first paragraph 404 includes two highlighting marks (410, 412). The second paragraph 406 includes an underlining mark 414. FIG. 4 specifies a pair of endpoints which demarcate a beginning position and ending position of each annotation. For example, the first highlighting mark 410 begins at position $G_{H1\_B}$ and ends at position $G_{H1\_E}$.

Different implementations can use different techniques to specify an endpoint within a document. In one non-limiting technique, the DPC 104 specifies any given position associated with a portion of text in a document by specifying: (1) its page number; (2) its line number (corresponding to the line of text in which the position occurs); (3) its run number (corresponding to a grouping of data in which the position occurs); (4) its glyph identifier (corresponding to a character associated with the position), etc.

In the examples of FIG. 4, the beginning and end positions of each annotation occur within the same document part. For example, the two highlighting marks (410, 412) both begin and end within the first paragraph 404, and the underlining mark 414 begins and ends in the second paragraph 406. In other cases (not shown), an annotation can span two or more different parts of a document. For example, in the context of the document 402 shown in FIG. 4, a highlighting mark can begin in the last sentence of the first paragraph 404 and end in the first sentence of the second paragraph 406.

Further, FIG. 4 shows examples in which each annotation has a non-zero span associated therewith, e.g., reflecting the length of a highlighting mark. In other cases, an annotation can have a single location associated with it. For example, a call-out-type comment may be defined by an anchor position within a page and the content of the comment itself. The DPC 104 can represent that kind of annotation in various ways, such as by storing a single location which designates the anchor position, or by storing beginning and ending positions which both refer to the same anchor position.

In another case (not shown), an annotation corresponds to a free-hand ink mark that a user draws across a portion of the document 402. Here, the DPC 104 can store location information which describes the shape and other characteristics of the ink mark itself, together with location information which specifies the position of the ink mark on the document 402. For example, the location information can include any of: a position which specifies the beginning of the ink mark; a position which specifies the end of the ink mark; information that identifies a position of a bounding box which encompasses the ink mark (together with the dimensions of the bounding box), etc.

Figure 5:
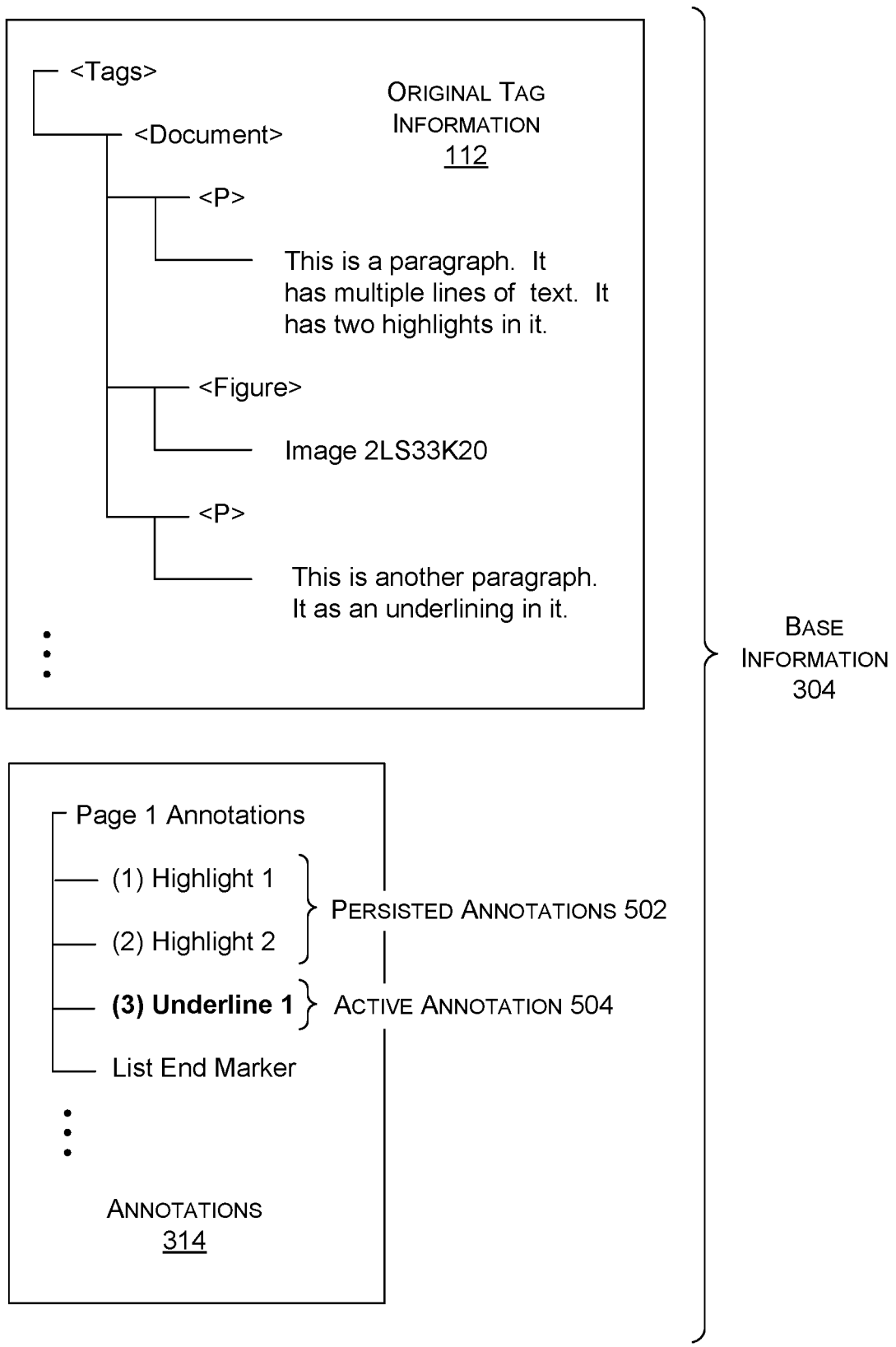
FIG. 5 shows base information associated with the document of FIG. 4.

FIG. 5 shows base information 304 associated with the single-page document 402 of FIG. 4, including the original tag information 112 and the annotations 314. In one implementation, the original tag information 112 provides a set of semantic tags associated with the different parts of the document 402. Here, the original tag information 112 arranges the semantic tags in a tree structure. For example, for the first paragraph 404, the tree structure can include a tag "<P>" which characterizes the first paragraph 404 as a paragraph. The tree structure can also include a pointer to the text associated with the first paragraph 404, or it can duplicate that text in the tree structure itself.

The list of annotations 314 associated with the page document include the two highlighting marks (410, 412) and the underlining mark (414). Each annotation can be referenced using its array index value. For example, the two highlighting marks (410, 412) have index values of 1 and 2, respectively, while the underlining mark 414 has an index value of 3. A dummy marker designates the end of the list.

In the example of FIG. 5, assume that the first two annotations in the list correspond to persisted annotations 502, while the third annotation corresponds to an active annotation 504. A persisted annotation corresponds to an annotation that a user has previously saved, e.g., by saving the document 402 after making these annotations. An active annotation corresponds to an annotation that the user has not yet saved. In one implementation, the document editing component 114 will not retain any active annotations unless the document 402 is saved prior to exiting the application associated with the document editing component 114. The document 402 is saved when the user explicitly executes a save command, or when the document editing component 114 automatically executes this command. The DPC 104 can successfully expose both persisted and active annotations. This is beneficial to the user because otherwise an annotation would be "invisible" to a sight-impaired user until the document 402 is saved. This would make it difficult for the user to interact with an annotation he or she has just created.

Figure 6:
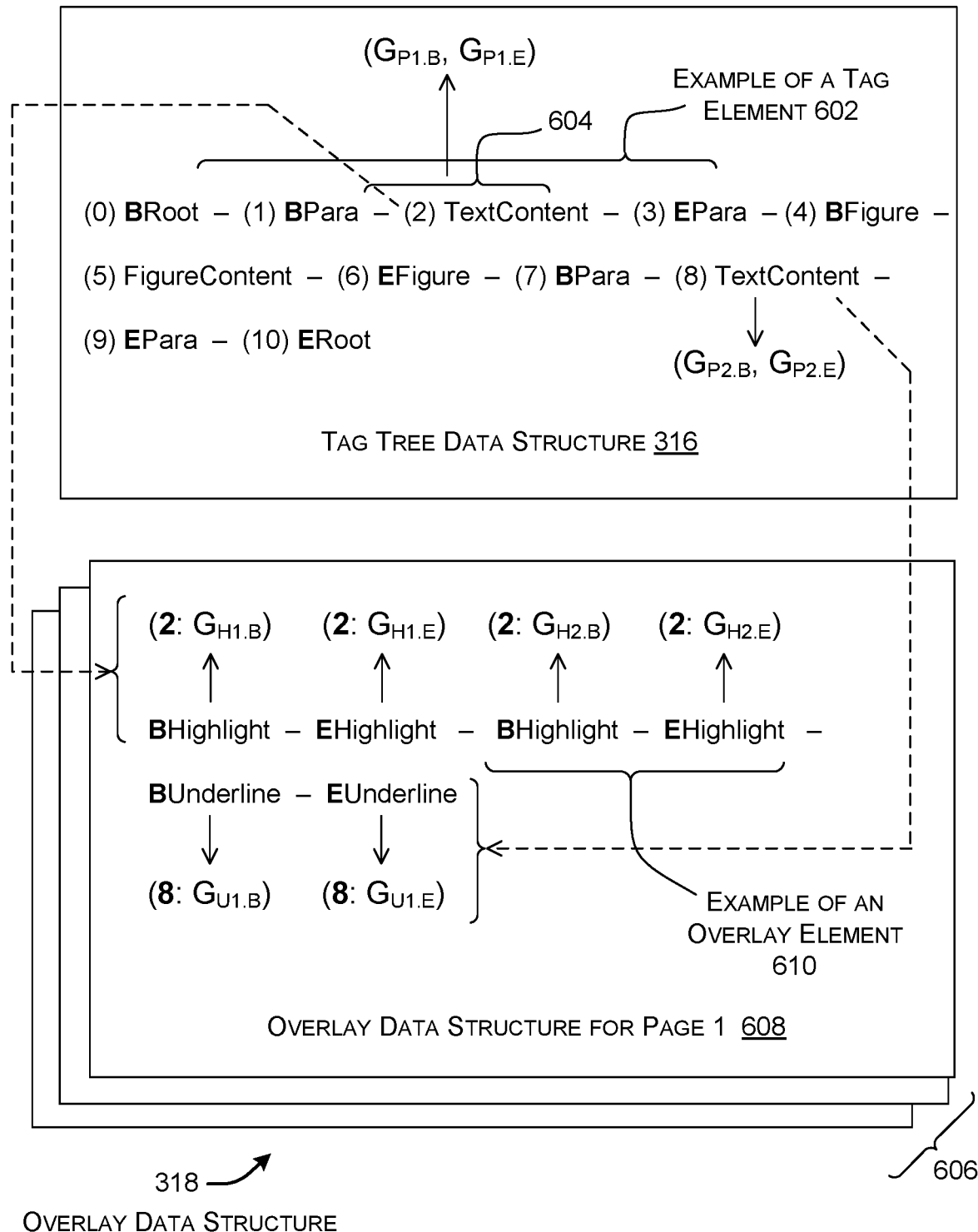
FIG. 6 shows a tag tree data structure and an overlay data structure generated by the computing environment of FIG. 1 at runtime, for the document of FIG. 4.

FIG. 6 shows the tag tree data structure 316 and the overlay data structure 318 that the DSPC 124 generates at runtime for the document 402. As explained with reference to FIG. 3, the DSPC 124 generates these two data structures (316, 318) based on the base information 304.

In one implementation, the DSPC 124 generates the tag tree data structure 316 as a tree vector that includes a nested set of tag elements. Each tag element, in turn, includes a begin tag node (indicated in FIG. 6 with the beginning character "B"), a content tag node, and an end tag node (indicated in FIG. 6 with the beginning character "E"). For example, one such tag element 602 that describes the first paragraph 404 includes a begin tag node ("BPara"), a content tag node 604 associated with the text of the first paragraph 404 ("TextContent"), and an end tag node ("EPara"). In another example (not shown), assume that a figure appeared inline within the first paragraph 404 of the document 402. The DSPC 124 would nest a tag element for the inline figure within the tag element 602 for the first paragraph 404.

Each tag node can include or makes reference to a set of information items. For example, each tag node can include an index value which specifies its position within the sequence of tag nodes in the vector. For example, the TextConent tag node 604 associated with the first paragraph 404 has an index value of 2 because it is the third tag node in the sequence of tag nodes in the vector. (Note that the "BRoot" tag node has the index value of 0.) Each tag node can also include information which identifies its type and content details. For example, the TextContent tag node 604 can include information which identifies it as a content tag node which describes the text in a paragraph. It can also make reference to the text it represents, or include a copy of the text itself. The TextContent tag node 604 can also specify the starting and ending locations ($G_{P1.B}$, $G_{P1.E}$) of the first paragraph 404 in the single-page document 402, etc. The above-described information items are described by way of illustration, not limitation; other implementations can associate a different set of information items with each tag element.

In one implementation, the DSPC 124 generates the overlay data structure 318 as a sorted link list. The overlay data structure 318 includes per-page sets 606 of overlay elements. Here, the DSPC 124 produces a single set 608 of overlay elements associated with the single-page document 402. The illustrative overlay element 610 is one such element in the overlay data structure 318. In one implementation, each overlay element includes a begin overlay node and an end overlay node. Each overlay node specifies a position, e.g., corresponding to a beginning position of an annotation (for a begin overlay node) or an ending position of the annotation (for an end overlay node). For example, the overlay element 610 corresponds to the second highlighting mark 412 in the first paragraph 404 of the document 402. The overlay element 610 therefore includes a begin overlay node ("BHighlight") which specifies a beginning position ($G_{H2.B}$) of the second highlighting mark 412, and an end overlay node ("EHighlight") which specifies the ending position ($G_{H2.E}$) of the second highlighting mark 412. Each overlay node also specifies the index value associated with the tag node to which it pertains. For example, the overlay nodes in the overlay element 610 both specify the index value 2 because they refer to the tag node in the tag tree data structure 316 having the index value 2. More specifically, the beginning and ending positions ($G_{H2.B}$, $G_{H2.E}$) both occur within the span of positions encompassed by beginning and ending positions ($G_{P1.B}$, $G_{P1.E}$) of the first paragraph 404. In other cases (not shown), an overlay element can include beginning and ending overlay nodes which have different index values; this would be true in the case in which an annotation spans two parts of the document 402.

FIG. 7 shows a scenario in which the DPC 104 of FIG. 1 provides information regarding the document 402 of FIG. 4 to the AT component 116. In operation (A), the user (or any other consuming entity) makes a request for information regarding a feature-of-interest in the document 402, given a specified input condition which describes the feature-of-interest. In operation (B), the AT component 116 makes an API call to the DPC 104. The API call specifies the input condition. In operation (C), the DPC's interface component 132 receives the call, and the DPC's tag access component 130 performs a lookup operation in response to the call. The tag access component 130 performs the lookup operation by consulting the tag tree data structure 316 in some cases, and the tag tree data structure 316 in conjunction with the overlay data structure 318 in other cases. In operation (D), the DPC 104 returns information that describes part information (which identifies an original part of the document 402) or annotation information (which identifies an annotation added to the document 402). In operation (E), the AT component 116 sends output information to its I/O device(s) 120. For example, a document-narration application sends output information to a speaker. The output information delivered by the speaker provides a spoken description of the feature-of-interest.

In some user scenarios, the computing environment 102 can use the above-described technique to retrieve information regarding a specific feature-of-interest. For example, a user can touch a part of the document 402 as displayed on a touch-sensitive display device. In response, the computing environment 102 can execute the above-described technique to retrieve details regarding the part of the document that the user has touched.

In other cases, the computing environment 102 can use the above-described technique to expose the semantic layout of the entire document 402, or a section thereof. Without limitation, FIG. 7 shows one technique for performing this operation. In operation (1), the AT component 116 ("client" for brevity) asks the DPC 104 to provide information regarding the root node of the document 402. In operation (2), the DPC 104 consults the tag tree data structure 316 to identify its first tag node. The DPC 104 then returns information associated with this root tag node to the client. In operation (3), the client asks for the next feature in the document, following the root node. In operation (4), the DPC 104 consults the tag tree data structure 316 to determine that the next tag node is "BPara," which identifies the start of the first paragraph 404. The DPC 104 sends information to the client associated with this tag node. In one implementation, the information corresponds to a tag which indicates that the next element is a paragraph. The information that is returned can optionally also include the text associated with the paragraph itself. In operation (5) the client outputs information regarding the first paragraph 404.

In operation (6), the client again asks for the next feature of the document 402. In operation (7), the DPC 104 consults the tag tree data structure 316 to discover that the next node in the reading order is a TextContent node having the index value of 2. In operation (8), the DPC's discovery that the next node is a TextContent node prompts it to consult the overlay data structure 318 to determine whether the TextContent node has any annotations associated with it. In making this determination, the DPC 104 identifies the first highlighting mark 410. More specifically, the DPC 104 can perform this lookup operation by first finding the set of overlay elements associated with the current page (although here there is only a single page). The DPC 104 can then find the first overlay node that is associated with the current tag node (associated with index value 2). In this example, the DPC 104 discovers that the first overlay element, associated with the first highlighting mark 410, is tagged with index value 2, and its first overlay node begins at GHLB. The DPC 104 can then verify whether the start of the first overlay element (here, GHLB) lies within the endpoints ($G_{P1\_B}$, $G_{P1\_E}$) associated with the first paragraph 404. Note that the end of the first overlay element ($G_{H1\_E}$) also lies within the endpoints of the first paragraph 404, but that is not a requirement; in other examples, the end of an annotation may lie in another content item. Here, this test is met. The DPC 104 concludes by sending information to the client which identifies the first highlighting mark 410. In operation (9), the client outputs information regarding the first highlighting mark 410. This information can include an indication that the first paragraph 404 includes a highlighting mark 410. In some implementations, the client can also output information which describes the specific text that is highlighted by the first highlighting mark 410.

In operation (10), the client again asks for the next feature. Upon receipt of this request, in operation (11), the DPC 104 notes that the last-identified feature was a highlighting mark 410 retrieved from the first paragraph 404. In this circumstance, the DPC 104 immediately consults the overlay data structure 318 again to determine whether any other annotations are encompassed by the first paragraph 404. Here, this lookup operation indeed reveals the second highlighting mark 412. The DPC 104 forwards information regarding the second highlighting mark 412 to the client, upon which, in operation (12), the client outputs information regarding this annotation.

In operation (13), the client again asks for the next feature. Upon receipt of this request, in operation (14), DPC 104 checks if there is a third annotation in the first paragraph 404. There is none. In response, the DPC 104 returns to the tag tree data structure 316 to get the next tag node, which is "EPara." In operation (15), the DPC 104 skips this tag node because it communicates no semantic information beyond that which has already been conveyed by the beginning tag node "(BPara)". It then identifies the next tag node as "BFigure," which indicates that the next part of the document 402 is the FIG. 408. The DPC 104 sends information to the client regarding the FIG. 408, upon which, in operation (16), the client outputs it to the user.

The above-described iterative process continues until the DPC 104 encounters the end of the document, marked by the ending root node. Note that the DPC 104 will reveal information regarding the underlining mark 414 in the second paragraph 406, even though this is an active annotation.

Different implementations can vary the above-described behavior in different ways. In another case, for example, the DPC 104 receives an initial request by the user to read out the entire semantic layout of the document 402 in the same manner specified above. But in this case, upon receiving the request, the DPC 104 can iteratively enumerate the contents of the document 402 without requiring prompting calls from the AT component 116. In still another case, the AT component 116 can make targeted requests for certain types of document parts, such as by requesting part information pertaining to just figures in the document 402. Or the AT component 116 can request information limited to annotations added to the document, or certain annotations that match a specified search condition, etc. In general, the DPC 104 provides structured resources that can be used to deliver in-context (e.g., in-order) information regarding the contents of the document 402 and its annotations; different implementations can retrieve this information from the DPC 104 using different protocols to serve different environment-specific objectives.

Figure 8:
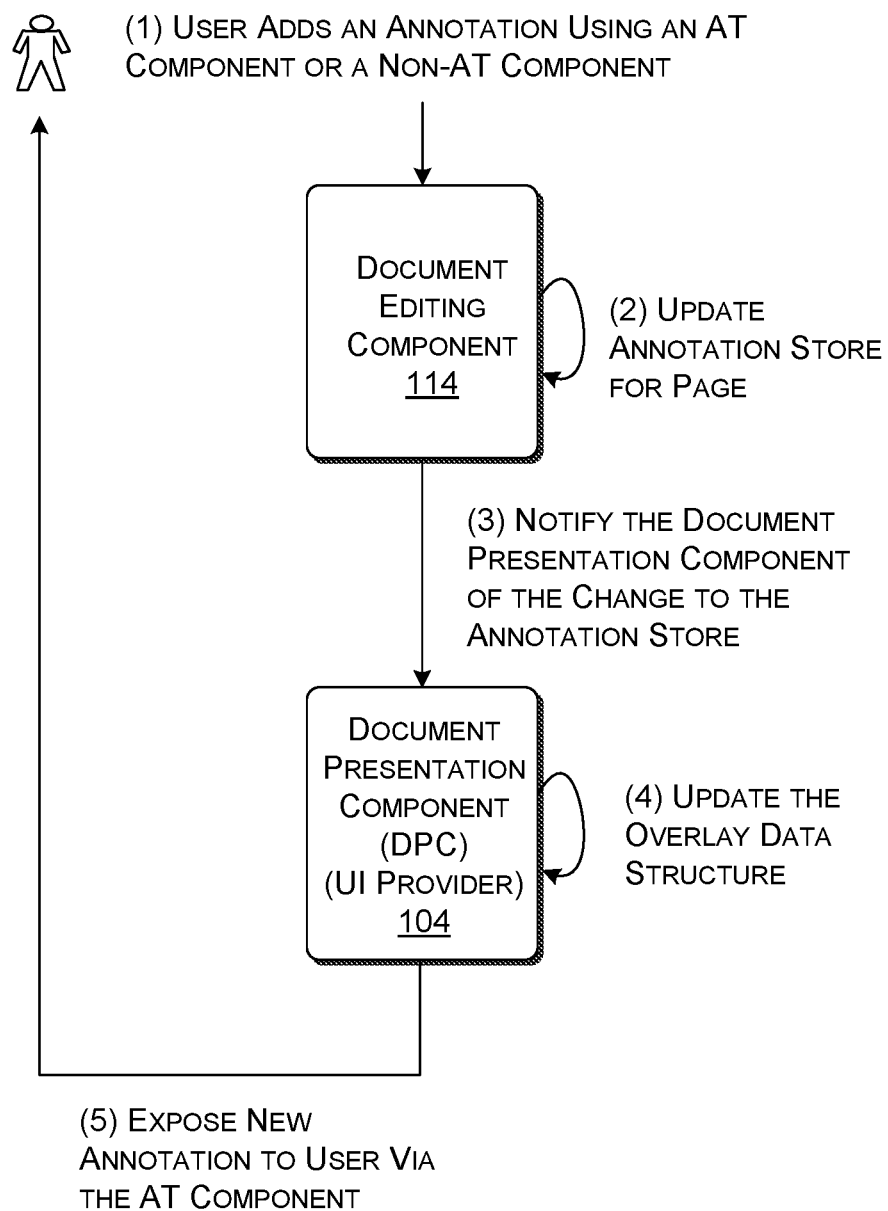
FIG. 8 shows a scenario in which the computing environment of FIG. 1 updates its overlay data structure when a user adds a new annotation to the document of FIG. 4.

FIG. 8 shows a scenario in which the DPC 104 updates its runtime data structures 302 when a user adds a new annotation to the document 402. For example, assume that, in operation (1), the user interacts with the document editing component 114 to add a strikethrough (not shown) to a word in the second paragraph 406. In operation (2), the document editing component 114 updates the document's set of annotations 314 by adding the new annotation to the bottom of its list of annotations. Accordingly, that new annotation would be assigned index value 4 in the list. In operation (3), the document editing component 114 can notify the DPC 104 of the addition of a new annotation. In operation (4), the DPC 104 can update its overlay data structure 318 to include a new overlay element at an appropriate position in the overlay data structure 318. For example, the DPC 104 can insert the new overlay element in the appropriate set of overlay elements (associated with the page of the document on which the new annotation appears). The DPC 104 can also insert the new overlay element at the appropriate position within the selected set, based on where the new annotation occurs in relation to the existing annotations on the page. In operation (5), upon updating the overlay data structure 318, the DPC 104 can immediately apprise a user (or other consumer) of the addition of the new annotation, e.g., automatically or when the user makes a request for information about the new annotation. Note that the DPC 104 exposes the new annotation without requiring the user to save the document 402.

Note that the DPC 104 was described above mainly in the context of annotations added to text in a document. But the DPC 104 can perform the same operations for annotations added to other kinds of content. For example, assume that the user generates a freehand ink mark over the FIG. 408. Or assume that the user adds a stamp or other graphic to the FIG. 408. The DPC 104 can expose information regarding these kinds of annotations in the same manner specified above. For instance, the tag tree data structure 316 can store bounding box information which describes the location of the FIG. 408 within the document 402. The overlay data structure 318 can provide an overlay element that provides: the index value associated with the FigureContent tag node in the tag tree data structure 316; and position information that identifies the position of the ink mark, e.g., by specifying its starting position, and/or ending position, and/or the location of a bounding box which encloses the ink mark.

In one implementation, the DPC 104 performs all processing that affects the tag tree data structure 316 and the overlay data structure 318 using an AT-mode processing thread. This processing thread handles creation, maintenance, and use of these runtime data structures 302. The DPC 104 performs all other processing using another default-mode processing thread. In one implementation, the default-mode processing thread is independent of the AT-mode processing thread and has a higher priority than the AT-mode processing thread. This is advantageous because it ensures that core functions directed to displaying and interacting with a document will not be negatively impacted by functions associated with generation, maintenance, and use of the runtime data structures 302. This allows, for instance, the computing environment 102 to display the content of the document while still preparing part information and annotation information for output to the AT component 116 using the AT-mode processing thread.

B. Illustrative Processes

Figure 10:
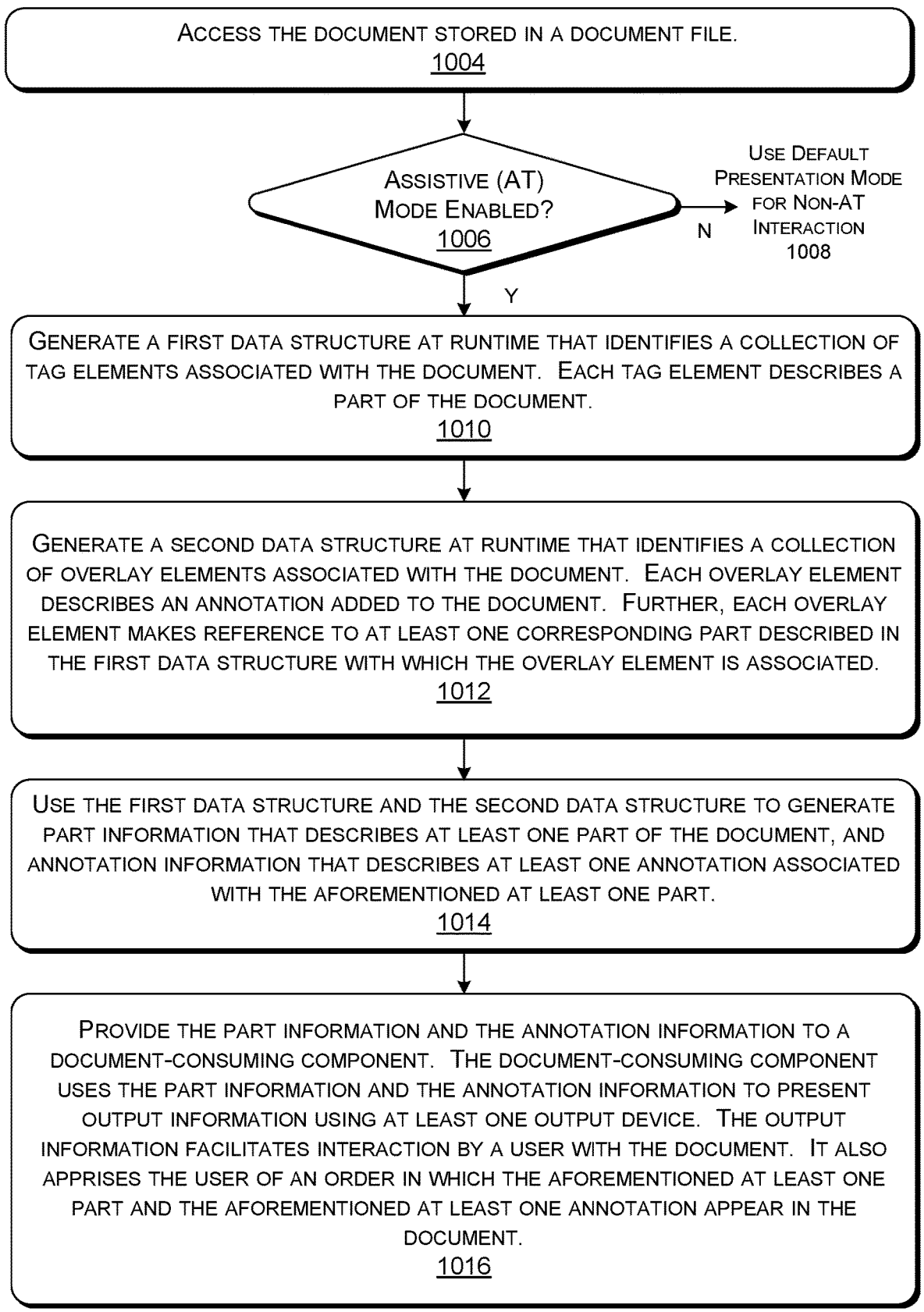
Figure 11:
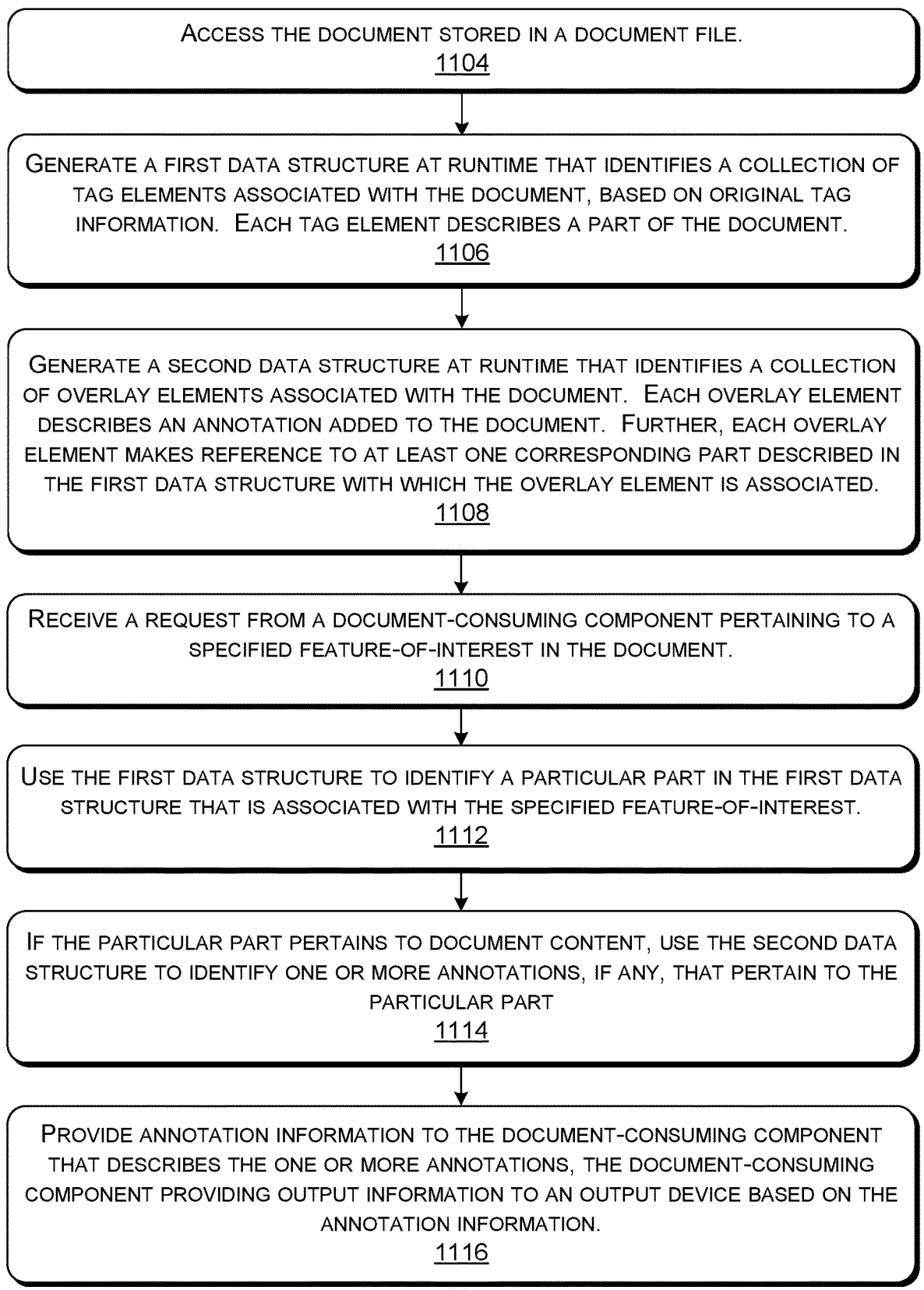

FIGS. 9-11 show three respective overviews of the operation of the computing environment 102 of FIG. 1 described in Section A, presented here in flowchart form. The different overviews emphasize different combinations of features associated with the operation of the computing environment 102. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 9 shows a process 902 that represents a first manner of operation of the computing environment 102 shown in FIG. 1. In block 904, the DPC 104 accesses a document stored in a document file 108. In block 906, the DPC 104 generates a first data structure 316 at runtime that identifies a collection of tag elements associated with the document, each tag element describing a part of the document. In block 908, the DPC 104 generates a second data structure 318 at runtime that identifies a collection of overlay elements associated with the document. Each overlay element describes an annotation added to the document. Further, each overlay element makes reference to at least one corresponding part described in the first data structure 316 with which the overlay element is associated. In block 910, the DPC 104 uses the first data structure 316 and the second data structure 318 to provide information to a document-consuming component 116' that specifies an order in which one or more annotations appear in the document relative to one or more parts in the document. In one implementation, at least one overlay element in the second data structure 318 describes an active annotation, each active annotation corresponding to a transient annotation that has not yet been saved.

FIG. 10 shows a process 1002 that describes another implementation of the operations of the computing environment 102 of FIG. 1. In block 1004, the DPC 104 accesses a document stored in a document file 108. In block 1006, the computing environment 102 determines whether an assistive technology (AT) mode (or more generally, a first mode) has been invoked. If not, then, in block 1008, the computing environment 102 uses a default second (non-AT) presentation mode to handle interaction between a user and the document. Otherwise, the process 1002 proceeds with operations 1010-1016. In block 1010, the DPC 104 generates a first data structure 316 at runtime that identifies a collection of tag elements associated with the document, each tag element describing a part of the document. In bock 1012, the DPC 104 generates a second data structure 318 at runtime that identifies a collection of overlay elements associated with the document. Each overlay element describes an annotation added to the document. Further, each overlay element makes reference to at least one corresponding part described in the first data structure 316 with which the overlay element is associated. In block 1014, the DPC 104 uses the first data structure 316 and the second data structure 318 to generate part information that describes at least one part of the document, and annotation information that describes at least one annotation associated with the aforementioned at least one part. In block 1016, the DPC 104 provides the part information and the annotation information to a document-consuming component 116'. The document-consuming component 116' uses the part information and the annotation information to present output information using at least one output device 120, the output information facilitating interaction by a user with the document. More specifically, the output information apprises the user of an order in which the aforementioned at least one part and the aforementioned at least one annotation appear in the document.

FIG. 11 shows a process 1102 that describes another implementation of the operations of the computing environment 102 of FIG. 1. In block 1104, the DPC 104 accesses a document stored in a document file 108. In block 1106, the DPC 104 generates a first data structure 316 at runtime that identifies a collection of tag elements associated with the document, each tag element describing a part of the document. It performs this task based on original tag information previously stored in the document file 108. In block 1108, the DPC 104 generates a second data structure 318 at runtime that identifies a collection of overlay elements associated with the document. Each overlay element describes an annotation added to the document. Further, each overlay element makes reference to at least one corresponding part described in the first data structure 316 with which the overlay element is associated. In block 1110, the DPC 104 receives a request from a document-consuming component 116' pertaining to a specified feature-of-interest in the document. In block 1112, the DPC 104 uses the first data structure 316 to identify a particular part in the first data structure that is associated with the specified feature-of-interest. In block 1114, if the particular part pertains to document content, the DPC 104 uses the second data structure 318 to identify one or more annotations, if any, that pertain to the particular part. In block 1116, DPC 104, provides annotation information to the document-consuming component 116' that describes the one or more annotations. The document-consuming 116' provides output information to an output device 120 based on the annotation information. The output information facilitates interaction by a user with the document.

C. Representative Computing Functionality

Figure 12:
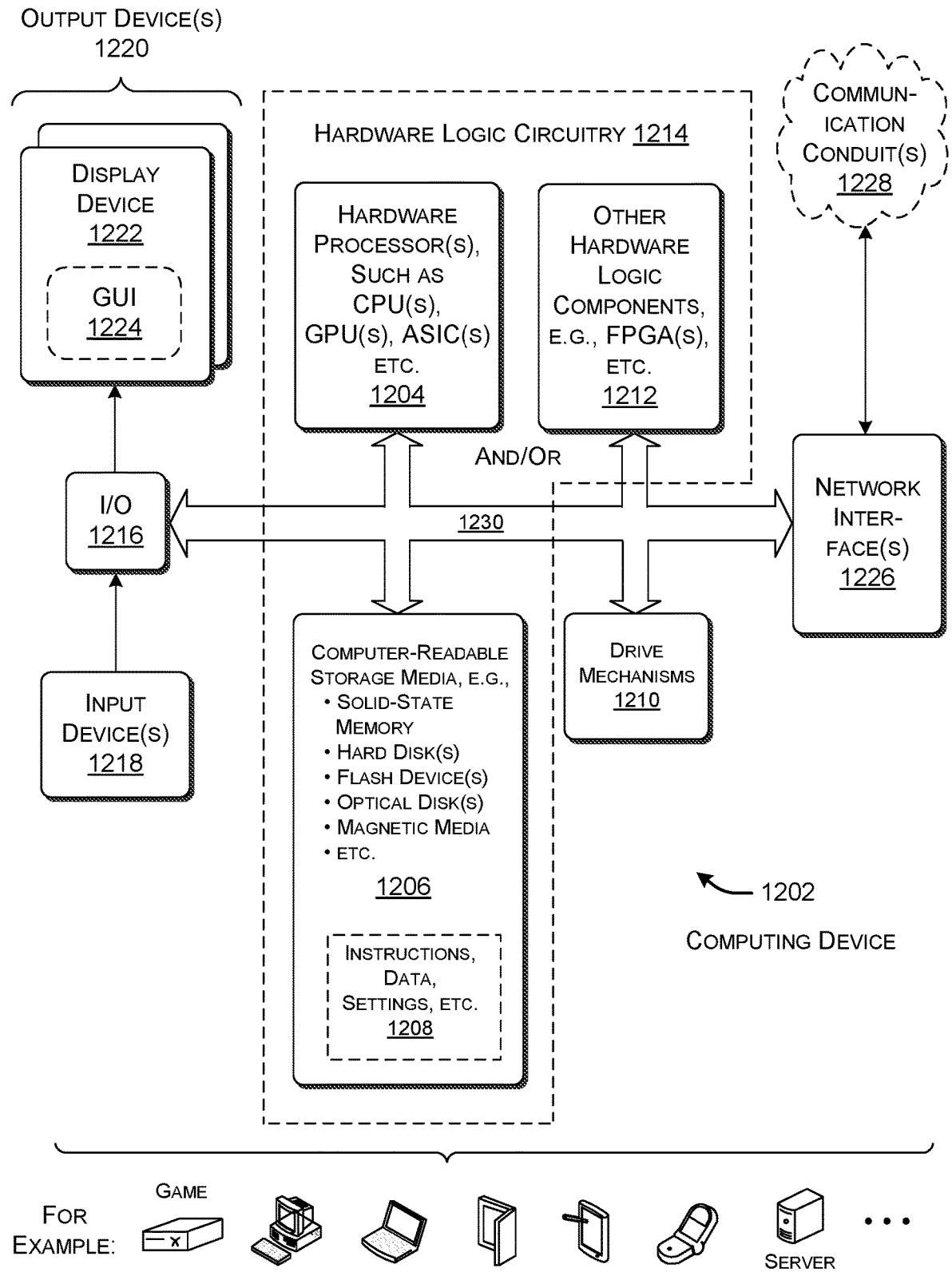
FIG. 12 shows an illustrative type of computing device that can be used to implement any aspect of the features shown in the foregoing drawings.

FIG. 12 shows a computing device 1202 that can be used to implement any aspect of the mechanisms set forth in the above-described figures. For instance, the type of computing device 1202 shown in FIG. 12 can be used to implement any of the computing device(s) 202 described in FIG. 2. In all cases, the computing device 1202 represents a physical and tangible processing mechanism.

The computing device 1202 can include one or more hardware processors 1204. The hardware processor(s) 1204 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1202 can also include computer-readable storage media 1206, corresponding to one or more computer-readable media hardware units. The computer-readable storage media 1206 retains any kind of information 1208, such as machine-readable instructions, settings, data, etc. Without limitation, for instance, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable component of the computing device 1202. Further, any instance of the computer-readable storage media 1206 may provide volatile or non-volatile retention of information.

The computing device 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing device 1202, and/or a hardware storage unit (such as a hard disk) for retaining/archiving information on a more permanent basis. In the latter case, the computing device 1202 also includes one or more drive mechanisms 1210 (such as a hard drive mechanism) for storing and retrieving information from an instance of the computer-readable storage media 1206.

The computing device 1202 may perform any of the functions described above when the hardware processor(s) 1204 carry out computer-readable instructions stored in any instance of the computer-readable storage media 1206. For instance, the computing device 1202 may carry out computer-readable instructions to perform each block of the processes described in Section B.

Alternatively, or in addition, the computing device 1202 may rely on one or more other hardware logic components 1212 to perform operations using a task-specific collection of logic gates. For instance, the hardware logic component(s) 1212 may include a fixed configuration of hardware logic gates, e.g., that are created and set at the time of manufacture, and thereafter unalterable. Alternatively, or in addition, the other hardware logic component(s) 1212 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware logic component(s) 1212. That is, the computing device 1102 can employ any combination of the hardware processor(s) 1204 that execute machine-readable instructions provided in the computer-readable storage media 1206, and/or one or more other hardware logic component(s) 1212 that perform operations using a fixed and/or programmable collection of hardware logic gates. More generally stated, the hardware logic circuitry 1214 corresponds to one or more hardware logic components of any type(s) that perform operations based on logic stored in and/or otherwise embodied in the hardware logic component(s).

In some cases (e.g., in the case in which the computing device 1202 represents a user computing device), the computing device 1202 also includes an input/output interface 1216 for receiving various inputs (via input device(s) 1218), and for providing various outputs (via output device(s) 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1202 can also include one or more network interfaces 1226 for exchanging data with other devices via one or more communication conduits 1228. One or more communication buses 1230 communicatively couple the above-described components together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing device 1202 as being composed of a discrete collection of separate units. In some cases, the collection of units may correspond to discrete hardware units provided in a computing device chassis having any form factor. FIG. 12 shows illustrative form factors in its bottom portion. In other cases, the computing device 1202 can include a hardware logic component that integrates the functions of two or more of the units shown in FIG. 1. For instance, the computing device 1202 can include a system on a chip (SoC or SOC), corresponding to an integrated circuit that combines the functions of two or more of the units shown in FIG. 12.

The following summary provides a non-exhaustive set of illustrative aspects of the technology set forth herein.

According to a first aspect, one or more computing devices are described for assisting a user in interacting with a document. The computing device(s) include: hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: accessing the document stored in a document file; generating a first data structure at runtime that identifies a collection of tag elements associated with the document, each tag element describing a part of the document; generating a second data structure at runtime that identifies a collection of overlay elements associated with the document, each overlay element describing an annotation added to the document, each overlay element making reference to at least one corresponding part described in the first data structure with which the overlay element is associated; using the first data structure and the second data structure to generate part information that describes at least one part of the document, and annotation information that describes at least one annotation associated with aforementioned at least one part; and providing the part information and the annotation information to a document-consuming component. The document-consuming component uses the part information and the annotation information to present output information using at least one output device, the output information facilitating interaction by a user with the document. Further, the output information apprises the user of an order in which aforementioned at least one part and aforementioned at least one annotation appear in the document.

According to a second aspect, the document is a Portable Document Format (PDF) document.

According to a third aspect, the operations further include generating the first and second data structures only when it is detected that the user has invoked a particular mode.

According to a fourth aspect, the aforementioned generating of the first data structure involves generating the first data structure based on original tag information previously associated with the document and stored in the document file.

According to a fifth aspect, the first data structure has a nested organization of tag elements, each tag element including: a begin tag node that demarcates a start of the tag element; a content tag node that describes content associated with the tag element, if any; and an end tag node that demarcates an end of the tag element.

According to a sixth aspect, the first data structure includes a collection of tag nodes, each tag node having an index value. Further, the second data structure makes reference to one or more tag nodes in the first data structure by specifying index values of aforementioned one or more tag nodes.

According to a seventh aspect, each tag element in the first data structure that describes a portion of text in the document specifies: a begin location that identifies a starting position of the portion of text; and an end location that identifies an ending position of the portion of text.

According to an eighth aspect, the second data structure stores overlay elements associated with at least two kinds of annotations, including: a persisted annotation that has been saved on a prior occasion; and an active annotation corresponding to a transient annotation that has not been saved.

According to a ninth aspect, dependent on the eighth aspect, the output information conveys information regarding both persisted annotations, if any, and active annotations, if any.

According to a tenth aspect, each overlay element in the second data structure includes at least one overlay node, each overlay node corresponding to a particular annotation.

According to an eleventh aspect, dependent on the tenth aspect, each overlay node specifies: a content tag node in the first data structure that is associated with the particular annotation; and a location that identifies a start or end of the particular annotation.

According to a twelfth aspect, each overlay element in the second data structure includes: a begin overlay node that demarcates a start of the overlay element; and an end overlay node that demarcates an end of the overlay element.

According to a thirteenth aspect, dependent on the twelfth aspect, the begin overlay node and the end overlay node point to a same content tag node in the first data structure.

According to a fourteenth aspect, dependent on the twelfth aspect, the begin overlay node and the end overlay node point to two different content tag nodes in the first data structure, corresponding to a case in which a corresponding annotation bridges two or more parts of the document.

According to a fifteenth aspect, the operations further include: receiving a request from the document-consuming component pertaining to a specified feature-of-interest in the document; using the first data structure to identify a particular part in the first data structure that is associated with the specified feature-of-interest; and if the particular part pertains to document content, using the second data structure to identify one or more annotations, if any, that pertain to the particular part. The aforementioned providing includes returning annotation information to the document-consuming component that describes the one or more annotations.

According to a sixteenth aspect, a method is described, implemented by one or more computing devices, for assisting a user in interacting with a document. The method includes: accessing the document stored in a document file; generating a first data structure at runtime that identifies a collection of tag elements associated with the document based on original tag information previously stored in the document file, each tag element describing a part of the document; generating a second data structure at runtime that identifies a collection of overlay elements associated with the document, each overlay element describing an annotation added to the document, each overlay element making reference to at least one corresponding part described in the first data structure with which the overlay element is associated; receiving a request from a document-consuming component pertaining to a specified feature-of-interest in the document; using the first data structure to identify a particular part in the first data structure that is associated with the specified feature-of-interest; if the particular part pertains to document content, using the second data structure to identify one or more annotations, if any, that pertain to the particular part; and providing annotation information to the document-consuming component that describes the one or more annotations. The document-consuming component provides output information to an output device based on the annotation information.

According to a seventeenth aspect, dependent on the sixteenth aspect, the document is a Portable Document Format (PDF) document.

According to an eighteenth aspect, the second data structure stores overlay elements associated with at least two kinds of annotations, including: a persisted annotation that has been saved on a prior occasion; and an active annotation corresponding to a transient annotation that has not been saved.

According to a nineteenth aspect, dependent on the sixteenth aspect, each overlay element of the second data structure includes at least one overlay node, each overlay node corresponding to a particular annotation. Further, each overlay node specifies: a content tag node in the first data structure which is associated with the particular annotation; and a location that identifies a start or end of the associated annotation.

According to a twentieth aspect, a computer-readable storage medium is described for storing computer-readable instructions. The computer-readable instructions, when executed by one or more hardware processors, perform a method that includes: accessing a document stored in a document file; generating a first data structure at runtime that identifies a collection of tag elements associated with the document, each tag element describing a part of the document; generating a second data structure at runtime that identifies a collection of overlay elements associated with the document, each overlay element describing an annotation added to the document, each overlay element making reference to at least one corresponding part described in the first data structure with which the overlay element is associated; and using the first data structure and the second data structure to provide information to a document-consuming component that specifies an order in which one or more annotations appear in the document relative to one or more parts in the document. At least one overlay element in the second data structure describes an active annotation, each active annotation corresponding to a transient annotation that has not been saved.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for assisting a user in interacting with a document, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   accessing the document stored in a document file;
   generating a first data structure at runtime that identifies a collection of tag elements associated with the document, each tag element describing a part of the document;
   generating a second data structure at runtime that identifies a collection of overlay elements associated with the document, each overlay element describing an annotation added to the document,
   wherein the first data structure includes a sequence of tag nodes, each particular tag node having an index value that specifies a position of the particular tag node within the sequence of tag nodes,
   wherein at least some, but not all, of the tag nodes in the first data structure are content nodes that describe respective instances of content in the document, a type of each tag node being identified by respective type information,
   wherein the second data structure makes reference to one or more content nodes in the first data structure by specifying a respective index value of each of said one or more content nodes; and
   providing output information regarding the document to an output device by sequencing through at least some of the tag nodes in the first data structure in an order defined by the index values, and, upon encountering a particular content node associated with a particular index value, consulting the second data structure to determine whether the second data structure includes a particular annotation associated with the particular index value, and outputting annotation information associated with the particular annotation,
   said providing output information not accessing the second data structure upon encountering another tag node in the first data structure that is not a content node.

2. The one or more computing devices of claim 1, wherein the document is a Portable Document Format (PDF) document.

3. The one or more computing devices of claim 1, wherein the operations further include generating the first and second data structures when it is detected that the user has invoked a particular mode, and not generating the first and second data structures when it is detected that the user has invoked another particular mode.

4. The one or more computing devices of claim 1, wherein said generating the first data structure involves generating the first data structure based on original tag information previously associated with the document and stored in the document file.

5. The one or more computing devices of claim 1, wherein the first data structure has a nested organization of tag elements, wherein the particular content node is part of a particular tag element, and where the particular tag element also includes:
   a begin tag node that demarcates a start of the particular tag element; and
   an end tag node that demarcates an end of the particular tag element.

6. The one or more computing devices of claim 1, wherein each particular tag element in the first data structure that describes a portion of text in the document specifies:
   a begin location that identifies a starting position of the portion of text; and
   an end location that identifies an ending position of the portion of text.

7. The one or more computing devices of claim 1, wherein the second data structure stores overlay elements associated with at least two kinds of annotations, including:
 a persisted annotation that has been saved on a prior occasion; and
 an active annotation corresponding to a transient annotation that has not been saved,
 wherein the output information conveys information regarding both persisted annotations and active annotations.

8. The one or more computing devices of claim 1, wherein the particular annotation is associated with a particular overlay element in the second data structure, the particular overlay element also including at least one overlay node.

9. The one or more computing device of claim 8, wherein each of said at least one overlay node of the particular overlay element specifies:
 the particular index value of the particular content node in the first data structure that is associated with the particular annotation; and, as separate information from the particular index value, a location that identifies a start or end of the particular annotation.

10. The one or more computing devices of claim 8, wherein the particular overlay element in the second data structure includes:
 a begin overlay node that demarcates a start of the particular overlay element; and
 an end overlay node that demarcates an end of the particular overlay element.

11. The one or more computing devices of claim 10, wherein the begin overlay node and the end overlay node both point to the particular content node in the first data structure.

12. The one or more computing devices of claim 10, wherein the begin overlay node and the end overlay node point to two different content nodes in the first data structure, one of which is the particular content node, corresponding to a case in which a corresponding annotation bridges two or more parts of the document.

13. A method, implemented by one or more computing devices, for assisting a user in interacting with a document, comprising:
 accessing the document stored in a document file;
 generating a first data structure at runtime that identifies a collection of tag elements associated with the document based on original tag information previously stored in the document file, each tag element describing a part of the document, wherein the first data structure includes a sequence of tag nodes associated with respective index values, and wherein at least some, but not all, of the tag nodes in the first data structure are content nodes that describe respective instances of content in the document, a type of each tag node being identified by respective type information;
 generating a second data structure at runtime that identifies a collection of overlay elements associated with the document, each overlay element describing an annotation added to the document, wherein the second data structure makes reference to one or more content nodes in the first data structure by specifying a respective index value of each of said one or more content nodes;
 receiving a request from a document-consuming component pertaining to at least part of the document;
 in response to said receiving the request, providing output information regarding said at least part of the document to an output device by sequencing through at least some of the tag nodes in the first data structure in an order defined by the index values, and, upon encountering a particular content node associated with a particular index value, consulting the second data structure to determine whether the second data structure includes a particular annotation associated with the particular index value, and outputting annotation information associated with the particular annotation,
 said providing output information not accessing the second data structure upon encountering another tag node in the first data structure that is not a content node.

14. The method of claim 13, wherein the document is a Portable Document Format (PDF) document.

15. The method of claim 13, wherein the second data structure stores overlay elements associated with at least two kinds of annotations, including:
 a persisted annotation that has been saved on a prior occasion; and
 an active annotation corresponding to a transient annotation that has not been saved.

16. The method of claim 13,
 wherein the particular annotation is associated with a particular overlay element of the second data structure, the particular overlay element including at least one overlay node, and
 wherein each of said at least one overlay node of the particular overlay element specifies: the particular index value of the particular content node in the first data structure which is associated with the particular annotation; and, as separate information from the particular index value, a location that identifies a start or end of the particular annotation.

17. A computer-readable storage medium for storing computer-readable instructions, the computer-readable instructions, when executed by one or more hardware processors, performing a method that comprises:
 accessing a document stored in a document file;
 generating a first data structure at runtime that identifies a collection of tag elements associated with the document, each tag element describing a part of the document, wherein the first data structure includes a sequence of tag nodes associated with respective index values, and wherein at least some, but not all, of the tag nodes in the first data structure are content nodes that describe respective instances of content in the document, a type of each tag node being identified by respective type information;
 generating a second data structure at runtime that identifies a collection of overlay elements associated with the document, each overlay element describing an annotation added to the document, wherein the second data structure includes overlay nodes which make reference to associated content nodes in the first data structure by specifying index values of the associated content nodes; and
 providing output information regarding at least part of the document to an output device by sequencing through at least some of the tag nodes in the first data structure in an order defined by the index values, and, upon encountering a particular content node associated with a particular index value, consulting the second data structure to determine whether the second data structure includes a particular annotation associated with the particular index value, and outputting annotation information associated with the particular annotation,
 the particular annotation being associated with at least one particular overlay node in the second data structure, said providing output information not accessing the second data structure upon encountering another tag node in the first data structure that is not a content node.

* * * * *